(12) United States Patent
Sosalla et al.

(10) Patent No.: US 7,000,363 B2
(45) Date of Patent: Feb. 21, 2006

(54) SYSTEM AND PROCESS FOR LOADING CONTAINERS WITH FORMED PRODUCT

(75) Inventors: Gerald Keith Sosalla, Appleton, WI (US); Michael Joseph Muhlebach, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 200 days.

(21) Appl. No.: 10/158,619

(22) Filed: May 29, 2002

(65) Prior Publication Data
US 2003/0221396 A1 Dec. 4, 2003

(51) Int. Cl.
B65B 5/10 (2006.01)
(52) U.S. Cl. .......................................... 53/272; 53/251
(58) Field of Classification Search ................. 53/154, 53/237, 250, 168, 251, 202, 534, 242, 247, 53/488; 198/605, 606, 626.1
See application file for complete search history.

(56) References Cited

U.S. PATENT DOCUMENTS

| | | | |
|---|---|---|---|
| 2,869,297 A | | 1/1959 | Neer |
| 3,021,655 A | | 2/1962 | Chadima et al. |
| 3,491,508 A | * | 1/1970 | Standley ..................... 53/473 |
| 3,683,584 A | | 8/1972 | Tigner |
| 3,854,270 A | | 12/1974 | Cloud et al. |
| 3,858,381 A | * | 1/1975 | Huber et al. ................. 53/569 |
| 3,908,333 A | | 9/1975 | Cavanna |
| 3,925,960 A | * | 12/1975 | Saari et al. ................... 53/167 |
| 3,940,907 A | * | 3/1976 | Ganz ........................... 53/48.1 |
| 4,100,324 A | | 7/1978 | Anderson et al. |
| 4,296,590 A | * | 10/1981 | Focke .......................... 53/531 |
| 4,870,799 A | * | 10/1989 | Bergerioux et al. ............ 53/55 |
| 5,010,712 A | | 4/1991 | Odenthal |
| 5,025,612 A | | 6/1991 | Monsees |
| 5,042,233 A | | 8/1991 | Huang et al. |
| 5,058,726 A | | 10/1991 | Merritt |

(Continued)

FOREIGN PATENT DOCUMENTS

EP 0 332 154 B1 11/1992

(Continued)

OTHER PUBLICATIONS

"Semi-Automatic Plastic Containers Loading System," Iman Packaging Solutions product brochure, Iman Pack S.p.A., Schio, Italy, available at least as early as May 28, 2002, 2 pages.

*Primary Examiner*—Louis K. Huynh
*Assistant Examiner*—John Paradiso
(74) *Attorney, Agent, or Firm*—Michael J. Bendel; Scott A. Baum

(57) ABSTRACT

The invention relates to a system and process for loading containers with formed product. The system includes a container transport assembly, a product transport assembly and a combined transport assembly. The container transport assembly advances and positions the containers along a first path towards a loading zone. The product transport assembly advances and positions the formed product along a second path towards the loading zone. The combined transport assembly defines a third path away from the loading zone. The first path and the second path share at least one common direction of travel and each path is in part independent of the other and each path is in part merged with the other. The formed product is loaded into the containers as the paths merge. Thereafter, the containers with formed product loaded therein are advanced away from the loading zone along the third path.

39 Claims, 11 Drawing Sheets

U.S. PATENT DOCUMENTS

| | | | |
|---|---|---|---|
| 5,115,625 A * | 5/1992 | Barbulesco et al. | 53/467 |
| 5,147,027 A * | 9/1992 | Cruver | 198/419.3 |
| 5,241,806 A | 9/1993 | Ziegler et al. | |
| 5,255,493 A | 10/1993 | Molison et al. | |
| 5,379,571 A | 1/1995 | Gottfreid | |
| 5,457,934 A * | 10/1995 | Lehtola | 53/250 |
| 5,553,442 A * | 9/1996 | Fadaie | 53/445 |
| 5,588,285 A * | 12/1996 | Odenthal | 53/534 |
| 5,701,726 A * | 12/1997 | Smith | 53/544 |
| 5,850,725 A * | 12/1998 | Chalendar | 53/566 |
| 6,263,940 B1 * | 7/2001 | Menayan | 156/556 |
| 6,269,969 B1 | 8/2001 | Huang et al. | |
| 6,463,713 B1 * | 10/2002 | Ruemeli | 53/52 |
| 6,470,651 B1 * | 10/2002 | Polazzi et al. | 53/466 |
| 6,895,730 B1 * | 5/2005 | Weaver et al. | 53/500 |
| 2002/0127937 A1 | 9/2002 | Lange et al. | |
| 2002/0195764 A1 | 12/2002 | Sosalla | |

FOREIGN PATENT DOCUMENTS

| | | |
|---|---|---|
| EP | 0 626 329 A1 | 11/1994 |
| EP | 1 147 988 B1 | 7/2003 |
| GB | 1137827 A | 12/1968 |
| WO | WO 01/74687 | 10/2001 |
| WO | WO 01/76437 | 10/2001 |
| WO | WO 02/092441 A2 | 11/2002 |
| WO | WO 02/096255 | 12/2002 |
| WO | WO 03/101835 A1 | 12/2003 |

* cited by examiner

SYSTEM AND PROCESS FOR LOADING CONTAINERS WITH FORMED PRODUCT

BACKGROUND OF THE INVENTION

Wiping sheets or wipes have been made from a variety of materials which can be dry or wet when used. Wipes can be moistened with a variety of suitable wiping solutions, and are then usually referred to as wet wipes. Typically, wipes have been stacked in a container in either a folded or unfolded configuration. For example, containers of wet wipes have been available wherein each of the wet wipes stacked in the container has been arranged in a folded configuration such as a c-folded, z-folded or quarter-folded configuration as are well known to those skilled in the art. Sometimes the folded wet wipes have also been interfolded with the wet wipes immediately above and below in the stack of wet wipes. In yet other configurations, the wipes have been placed in the container in the form of a continuous web of material of similarly weakened line connected sheets from the first sheet to the last which includes perforations to separate the individual wipes and which wipes can be stacked on top of each other in a fan folded manner or wound into a roll. Such wipes and wet wipes have been used for baby wipes, hand wipes, household cleaning wipes, industrial wipes and the like.

The conventional packages which contain wipes, such as those described above, have typically been designed to be positioned on a flat surface such as a countertop, changing table or the like. Such conventional packages have generally provided a plastic container, tub or package which provides a sealed environment for the sheets or wipes to ensure that they do not get contaminated by the environment surrounding the container or become overly dry in the case of wet wipes. To get the wipes into the packages, various techniques have been used. One such technique includes forming a stack of wipes on one assembly line while providing tubs from another assembly line. Then, the tubs are loaded with wipes by dropping and/or forcing the wipes down into the tubs as the wipes assembly line overlies the tub assembly line at a perpendicular T-shaped intersection. That is, there is a T-shaped intersection where the wipes assembly line is positioned above the tubs assembly line such that when the wipes get to the head of the T they are dropped/forced into the tubs below which are positioned opening side up. Next, the loaded tubs are advance away from the T-shaped intersection and further packaging is completed.

The loading of containers with such conventional techniques has not been completely satisfactory. For example, this is due at least in part to the configuration of the techniques and encountered limits on container loading rates. Such limits are believed to be caused by the orientation of the wipes and container assembly lines relative to each other, i.e., they are perpendicular to one another. Still further, for example, these limits are also believed attributed to the manner in which the wipes are loaded into the tubs, i.e., dropped/forced down into the tubs where the tubs are in an opening up orientation.

SUMMARY OF THE INVENTION

In response to the difficulties and problems discussed above, for example, a new system and process for loading containers, e.g., tubs, with formed product, e.g., wipes, has been developed. The purposes and features of the present invention will be set forth in and are apparent from the description that follows, as well as will be learned by practice of the invention. Additional features of the invention will be realized and attained by the system and process particularly pointed out in the written description and claims hereof, as well as from the appended drawings.

In one aspect, the invention provides a system for loading containers with formed product. The system includes a container transport assembly which advances and positions the containers along a first path towards a loading zone. Also included is a product transport assembly which advances and positions the formed product along a second path towards the loading zone. The containers are advanced and positioned relative to the formed product and in at least one common direction of travel with the formed product. At least a portion of the first path superposes the second path and the paths travel in a common linear direction towards the loading zone. The system further includes a combined transport assembly defining a third path away from the loading zone. The first path and the second path share at least one common direction of travel and each path is in part independent of the other and each path is in part merged with the other. The formed product is loaded into the containers as the paths merge and thereafter the containers with formed product loaded therein are advanced away from the loading zone along the third path.

In another aspect, the invention provides a system for loading containers with formed product. The system includes a container transport assembly which advances and positions the containers along a first path towards a loading zone. The containers can have an opening, with the containers being in an opening down position. The system also includes a product transport assembly which advances and positions the formed product along a second path towards the loading zone. The containers are advanced and positioned relative to the formed product and in at least one common direction of travel with the formed product. Further, the system includes a combined transport assembly defining a third path away from the loading zone. The first path and the second path share at least one common direction of travel and each path is in part independent of the other and each path is in part merged with the other. The formed product is loaded up into the containers in a loading direction against a force of gravity as the paths merge and thereafter the containers with formed product loaded therein are advanced away from the loading zone along the third path.

In other aspects, the invention provides a system for loading containers with formed product. The system includes a container transport assembly which advances and positions the containers along a first path towards a loading zone. The containers can have an opening and be in an opening down position. The system also includes a product transport assembly which advances and positions the formed product along a second path towards the loading zone. The containers are advanced and positioned relative to the formed product and in at least one common direction of travel with the formed product and at least a portion of the first path superposes the second path and the paths travel in a common linear direction towards the loading zone. The system further includes a combined transport assembly defining a third path away from the loading zone. The first path and the second path share at least one common direction of travel and each path is in part independent of the other and each path is in part merged with the other. The formed product is loaded up into the containers in a loading direction against a force of gravity as the paths merge and thereafter the containers with formed product loaded therein are advanced away from the loading zone along the third path.

In still other aspects, the invention provides a system for loading containers with formed product. The system includes means for moving the containers along a first path towards a loading zone. The system also includes means for moving the formed product along a second path towards the loading zone. The containers are moved relative to the formed product and in at least one common direction of travel with the formed product and at least a portion of the first path superposes the second path and the paths travel in a common linear direction towards the loading zone. Further, the system includes means for moving the containers and the formed product together along a third path away from the loading zone. The first path and the second path share at least one common direction of travel and each path is in part independent of the other and each path is in part merged with the other. The formed product is loaded into the containers as the paths merge and thereafter the containers with formed product loaded therein are moved away from the loading zone along the third path by the means for moving containers and formed product together.

In still further aspects, the invention provides a process for loading containers with formed product. This can include various steps and in various orders or as follows: advancing and positioning the containers in an opening down position along a first path; advancing and positioning the product along a second path, where the containers and the product are advanced and positioned in at least one common direction of travel and with each path in part independent of the other; intersecting the first path and the second path; and, loading the formed product up into the containers in a loading zone where the first path is intersecting the second path.

In yet other aspects, the invention provides various configurations for the containers, the different assemblies, and process steps.

As used herein, "formed product" means a mass of material having a defined shape and which mass is able to self support such shape (e.g., without the aid of a container or structure other than the mass of material itself) while the mass is on a horizontal surface, e.g., a stack or roll of wipes on a support pathway or transport belt.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the present invention. Together with the description, the drawings serve to explain various aspects of the invention.

BRIEF DESCRIPTION OF THE DRAWINGS

The drawings are merely representative and are not intended to limit the scope of the claims. Like parts depicted in the drawings are referred to by the same reference numerals.

DETAILED DESCRIPTION OF THE INVENTION

Figure 1:
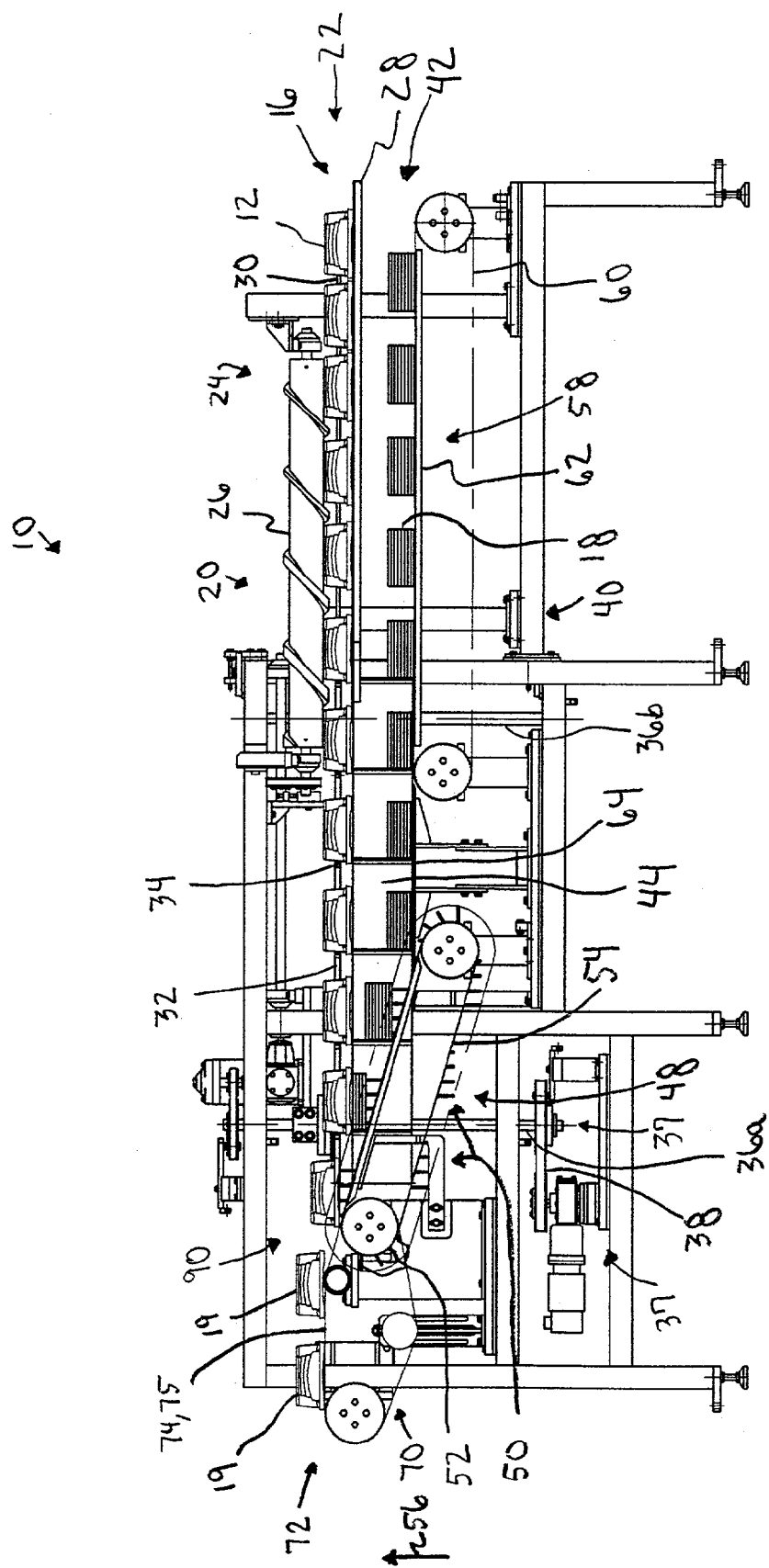
FIG. 1 representatively shows a schematic front view of a system and process for loading containers with formed product, taken along the line 1—1 of FIG. 2, in accordance with the present invention.
Figure 2:
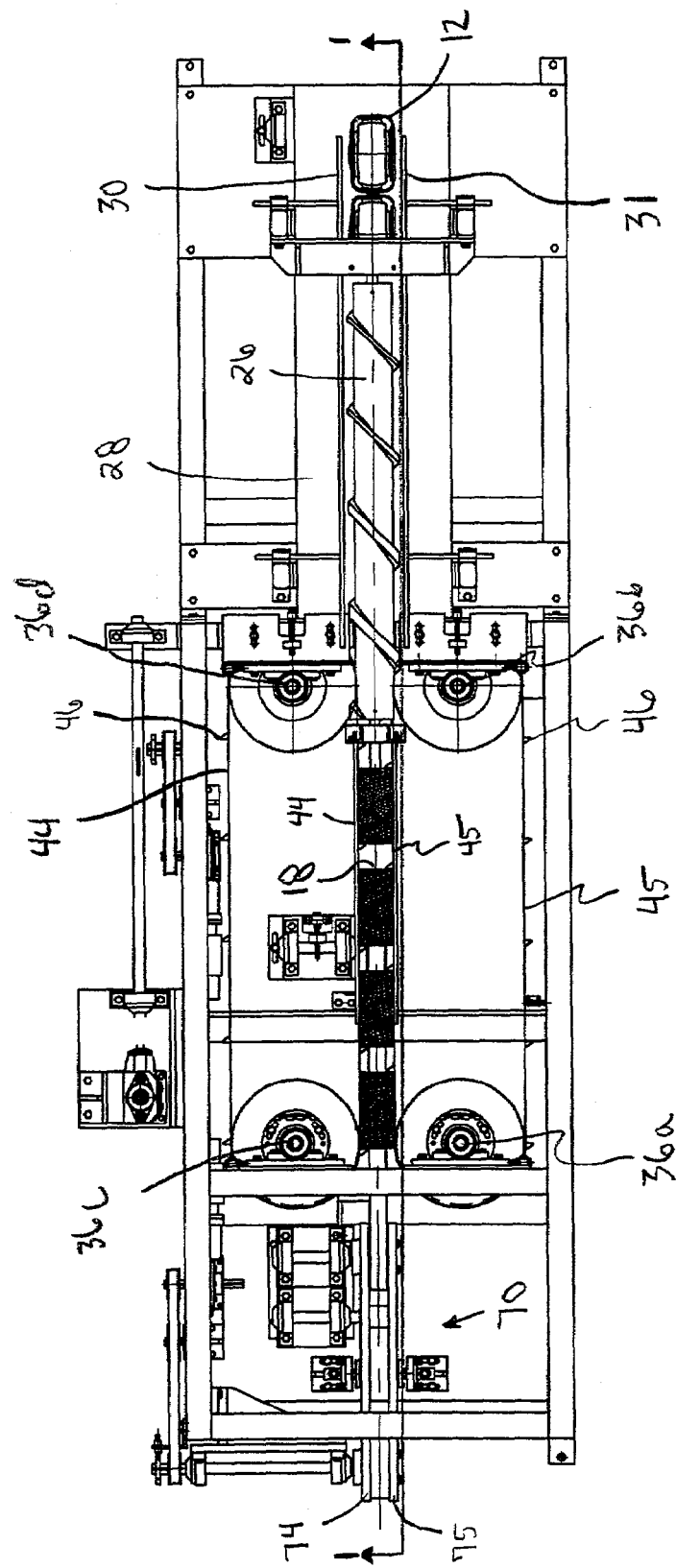
FIG. 2 representatively shows a schematic top view of the system and process seen in FIG. 1.

As representatively illustrated throughout the figures, and for explanation now referring to FIGS. 1 and 2, there is depicted a system 10 and process for loading containers 12 with formed product 18. System 10 generally includes a container transport assembly 20 overlying a product transport assembly 40, with each assembly 20 and 40 merging together and then advancing loaded containers into a combined transport assembly 70. The containers 12 have an opening 14 (better seen in FIG. 10) through which product is loaded into the containers. When loading containers with formed product, opening 14 can be in an opening down position 16, which is generally any position at least a portion of which faces in the direction of gravity, i.e., gravity being straight down if the system 10 in FIG. 1 is atop a ground surface. However, it should be understood that features of the invention may still be able to be implemented when the containers 12 are not in the opening down position 16, as long as related portions of the system and process are configured relative to the opening down position 16.

More particularly, and now also referring to FIGS. 4–9, container transport assembly 20 advances and positions the containers 12 along a first path 22 towards a loading zone 90. The container transport assembly can include a spacing mechanism 24. For example, spacing mechanism 24 can be a screw-like feeder 26 in combination with a support pathway 28 and a pair of spaced guides 30, 31. Feeder 26 can be any conventional rotary operated screw or screw-like elongate member. While a screw-like member is discussed, any mechanical way of advancing and/or positioning the containers along the path 22 can be employed. The advantage of the feeder 26 is that it can serve to both advance and position the containers along the path, although both functions need not be performed by one instrument as long as they are accomplished at some point along the path 22. Pathway 28 is any rigid support surface over which the containers can slide relatively easily as the feeder rotates. Similarly, guides 30, 31 are any rigid structures along which the containers can slide relatively easily as the feeder rotates. Although not shown, the containers can be provided to the system 10 and introduced into path 22 (e.g., at the right side of the system seen in FIGS. 1–2 and 7–8) by conventional container providing equipment, such as wet wipes tub denesting and supply equipment. Further, based on the operation of the system and process, the containers can be, advantageously, preformed before entry into the first path. This is contrasted with containers that are formed around product in-line to thereby encase the product with the containers, rather than load the product into preformed containers as with the present invention.

As containers 12 continue along path 22 of the assembly 20, they begin to exit the spacing mechanism 24 and begin to enter a pair of container transport belts 32, 33. Container transport belt 32 is spaced apart from the other such belt 33 and together they are configured to maintain the containers 12 therebetween, i.e., forcibly sandwiching the containers between the belts 32, 33. Alternatively or additionally, the containers can rest on the top edge of belts 44 & 45 and/or just be sandwiched between them. In any of these ways, the containers can continue to be advanced and/or positioned along first path 22 towards loading zone 90. The belts 32, 33 can each include spaced lugs 34 located on their outer surface. Lugs 34 can be any protrusion extending from the outer surface of the belt and which is at least semi-permanently attached to the belt. The lugs assist in the positioning of the containers as they enter between the container transport belts. Also, a relative positioning of the container transport belts can be modified to accommodate locating various size containers therebetween. In this way, one need not change the location of the lugs on the belts, but only the positioning (i.e., phase) of the belts relative to one another to thereby place cooperating lugs on each spaced belt 32, 33 at particular intervals 35 sized for desired containers. When phasing belts 32, 33 relative to one another to accommodate different container lengths, it is desirable that a single lug per belt contacts the container. That is, the lug from one belt contacts the leading edge of the container while the lug from the other belt contacts the trailing edge. Also, for different container widths, it is desirable that the belts be adjustable in the cross direction relative to each other. Belts 32, 33 can be driven by conventional equipment, such as that seen in the Figures, and in a configuration similar to that seen in the Figures.

Containers 12 can be variously oriented when traveling through the paths 22, 42 and 72. For example, while shown with the latch portion of the tub facing the guide 30 and the container hinge portion facing the guide 31 (FIGS. 1 and 2), such could be reversed and the latch portion of the tub could be facing the guide 31 with the container hinge portion facing the guide 30. Also, depending upon the orientation and the type of container, the container could travel though the paths 22, 42 and 72 without (as shown) or with a top or cover attached. If a top is already attached, for example, the container could travel though the paths 22, 42 and 72 in the orientation shown in FIGS. 1 and 2 and the top would just extend away from the container (i.e., out towards the front of the system seen in FIG. 1) and generally in the same plane as the initial opening of the container.

Simultaneously, though not necessarily in alignment until entering the loading zone, as container transport assembly 20 advances and positions the containers 12 along the first path 22, the product transport assembly 40 advances and positions the formed product 18 along a second path 42 towards the loading zone 90. The containers 12 are advanced and positioned relative to the formed product 18 and in at least one common direction of travel with the formed product, and consequently, vice versa for the product relative to the containers. Also, at least a portion of the first path 22 superposes the second path 42, i.e., at least in the loading zone, and the paths travel in a common linear direction towards the loading zone. As long as the containers come into substantial superposed alignment, i.e., vertically aligned so the profile of the product is below and encompassed by a downward projection of the profile of the container opening, by the time each enters the loading zone, the positioning of the product into alignment with the containers can occur anywhere along the respective paths 22, 42. For example, as seen in the Figures, the product and containers are in substantial alignment as each enters its respective transport belts and then they are each further advanced and positioned relative to one another, and particularly in superposed alignment, until the two paths merge in the loading zone.

The product transport assembly can include a product conveying mechanism 58. For example, conveying mechanism 58 can be a belt 60 driven over a support pathway 62. While a belt is discussed, any mechanical way of advancing and/or positioning the product 18 along the pathway 62 can be employed. Pathway 62 is any rigid support surface over which the belt can slide relatively easily as the belt advances. Although not shown, the product can be provided to the system 10 and introduced into path 42 (e.g., at the right side of the system seen in FIGS. 1–2 and 7–8) by conventional product providing equipment, such as wet wipes forming and supply equipment.

As product 18 continues along path 42 of the assembly 40, it begins to exit the conveying mechanism 58 and begins to enter a pair of product transport belts 44, 45. Product transport belt 44 is spaced apart from the other such belt 45 and together they are configured to maintain the formed product 18 therebetween, i.e., lightly sandwiching the product between the belts 44, 45 as opposed to the forcible sandwiching of the containers which is needed to maintain the container between the belts against a force of gravity acting on the containers. The product can continue to be advanced and/or positioned along first path 22 towards a product escalator 48, and ultimately loading zone 90. The belts 44, 45, similar to the belts 32, 33, can each include spaced lugs 46 located on their outer surface. Lugs 46 can be any protrusion extending from the outer surface of the belt and which is at least semi-permanently attached to the belt. The lugs assist in the positioning of the product as it enters between the product transport belts. Also, a relative positioning of the product transport belts can be modified to accommodate locating various size product therebetween. In this way, one need not change the location of the lugs on the belts, but only the positioning (i.e., phase) of the belts relative to one another to thereby place cooperating lugs on each spaced belt 44, 45 at particular intervals 47 sized for desired product. When phasing belts 44, 45 relative to one another to accommodate different formed product lengths, it is desirable that a single lug per belt contacts the formed product. That is, the lug from one belt contacts the leading edge of the formed product while the lug from the other belt contacts the trailing edge. Also, for different formed product widths, it is desirable that the belts be adjustable in the cross direction relative to each other. Belts 44, 45 can be driven by conventional equipment, such as that seen in the Figures, and in a configuration similar to that seen in the Figures.

As the product leaves belt 60 it traverses over a plate 64 by advancement of the belts 44, 45, until the product encounters the escalator 48. The product escalator has a plurality of finger groups 50, and each finger group has a plurality of graduated fingers 52 connected to an escalator belt 54. Fingers 52 can be any protrusion extending from the outer surface of the belt 54 and which are at least semi-permanently attached thereto. The fingers can be individually attached to the belt to provide greater flexibility in operation of the escalator, but such is not required. Each product is picked up by a finger group 50 and it begins to ascend in a loading direction 56 against a force of gravity and into the loading zone, which also coincides with the merging of paths 22, 42. The fingers 52 in a finger group 50 can be oriented to support and move the stack, advantageously, relative to the container opening (i.e. square) as well as parallel to the lugs on belts 44 and 45. The pitch between the finger groups 50 is preferentially the pitch between the formed product (and containers) divided by the cosine of the angle between the escalator belt 54 and the container (and formed product) paths 22, 42. Likewise, to maintain the same velocity with the containers (and formed product), the velocity of the escalator belt 54 is preferentially the velocity of the containers (and formed product) divided by the cosine of the angle between the escalator belt and the formed product (and containers). The belts 44, 45, act to maintain the positioning of the product on its respective finger group 50, i.e., almost exclusively horizontally as opposed to vertically, and the escalator serves to advance the product, i.e., both vertically and horizontally, upwards against the force of gravity. In general, the product escalator operates in tandem with the pair of product transport belts. Escalator 48 can be driven by conventional equipment, such as that seen in the Figures, and in a configuration similar to that seen in the Figures.

Once the finger groups 50 reach the top of the escalator 48, the product 18 is fully loaded into the containers 12. As fully loaded, the lower most portion of product and the lower most portion of the container may be co-planar or slightly offset relative to one another. As the loaded containers 19 leave the escalator 48 and loading zone 90, they enter the combined transport assembly 70 defining a third path 72 which leads away from the loading zone. The combined transport assembly could be a pair of combined transport belts 74, 75, or any number of belts as desired. Both the lower most portion of the formed product and the lower most portion of the container rest on the belts 74, 75 and together each loaded container 19 is advanced away from the loading zone along the third path 72. As the loaded containers exits the escalator belt 54, the trailing end of the loaded containers is (though not required) pushed up by the trailing longer fingers of the finger groups 50 going around the top pulley for the escalator belt. Because of this, the transport belts 74, 75 can be ramped up to at least keep the loaded containers parallel with the combined transport belts until the loaded containers completely exit the loading zone. From there, (not depicted in the drawings) the loaded containers can be further assembled, e.g., by adding tops, wrappers, etc., and then be further or finally packaged and made ready for consumer sale and use. The combined transport belts 74, 75 can be driven by conventional equipment, such as that seen in the Figures, and in a configuration similar to that seen in the Figures.

As concerns the timing and/or positioning of parts of the system, and thus the corresponding containers and formed product, the container transport belts 32, 33 and the product transport belts 44, 45 can share common shafts 36a, 36b, 36c and 36d. As such, these can be mechanically linked/timed to one-another via the common shafts 36a–d. Shafts 36a–d can be, likewise, mechanically linked/timed to one-another via a set of pulleys 37 and a timing belt 38. The screw-like feeder 26 can be mechanically linked/timed to the shafts 36a–d also, keeping it in time with the container transport belts 32, 33 and product transport belts 44, 45. All of the just mentioned parts can be powered by one or more drives (e.g. electronic drives, electronic servo drives, or other drives that provide the desired movement). The product transport belt 60 can have its own electronic servo drive or it could share a drive. The product escalator 48 and combined transport belts 74, 75 can be mechanically linked/timed together, and have an electronic servo drive of their own or they could also share a drive. The three (or more or less) servo drives can be timed to one-another electronically. Alternatively, the drive(s) of every section of the system 10 could be linked together by timing belts, gears and timing pulleys to maintain timing relative to one another. With such a drive arrangement, only one motor would be needed.

Figure 3:
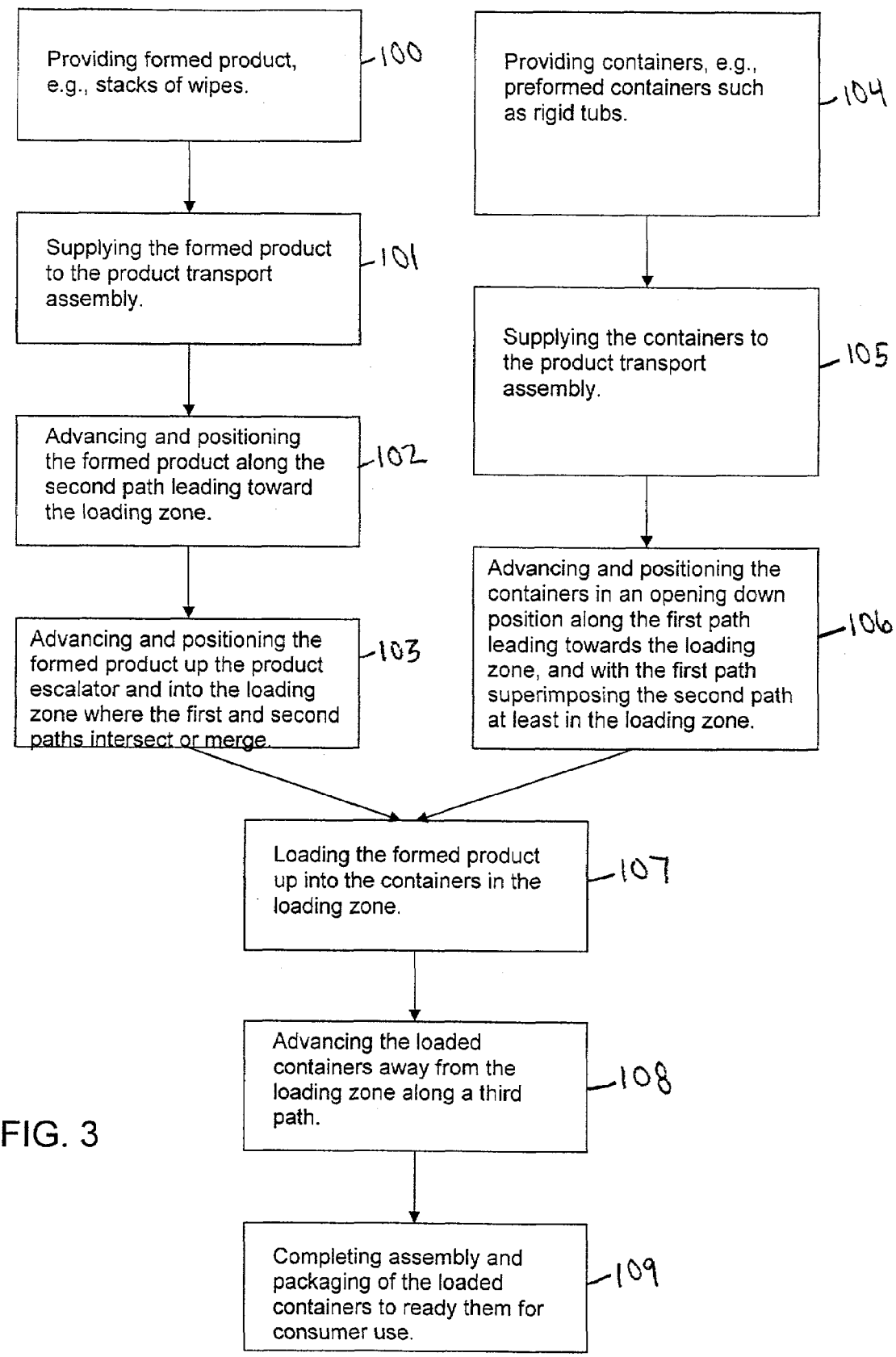
FIG. 3 shows a flow chart of representative steps of the process of the invention.
Figure 4:
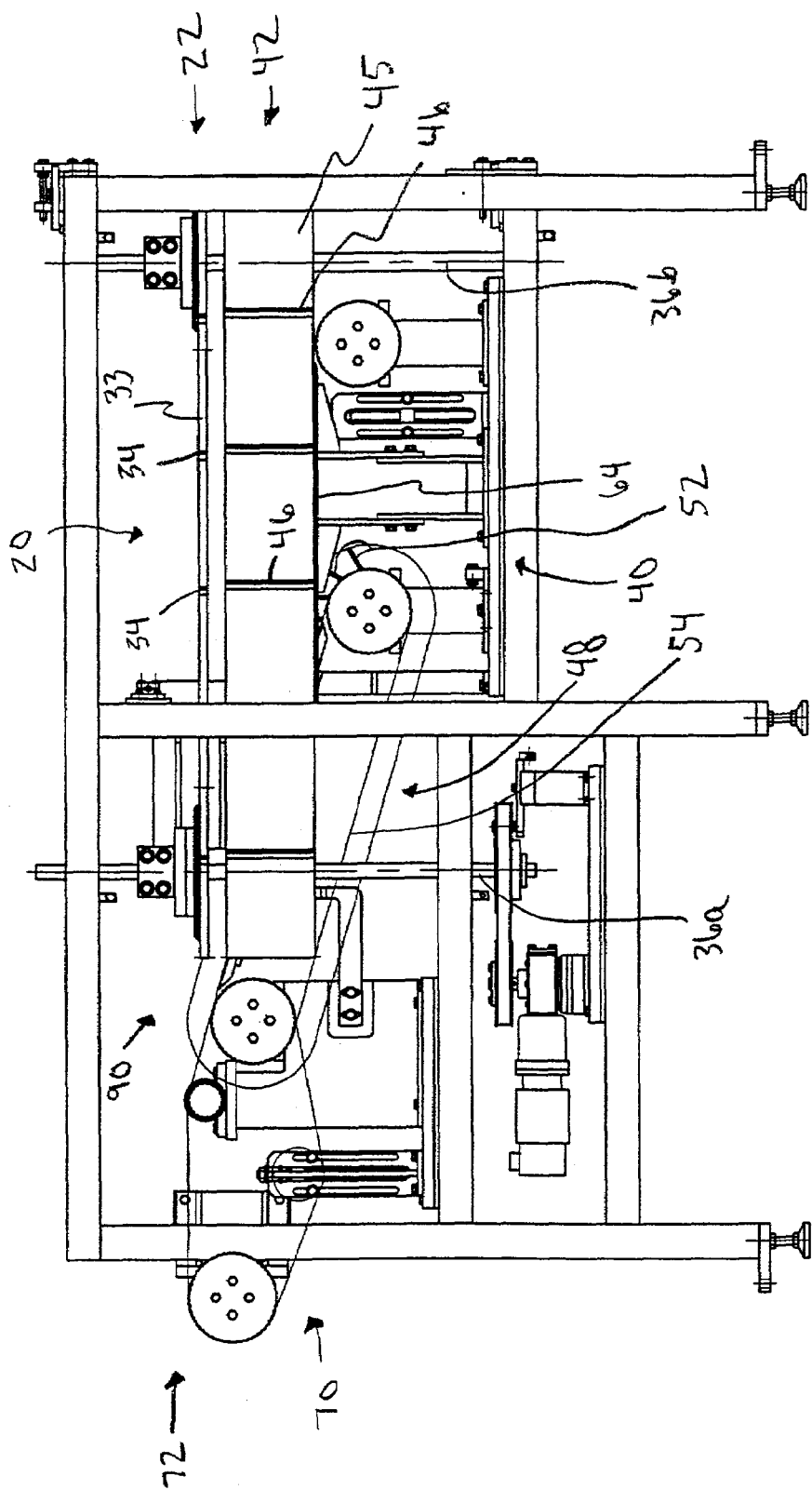
FIG. 4 representatively shows a schematic front view of a portion of the system and process seen in FIG. 2.
Figure 5:
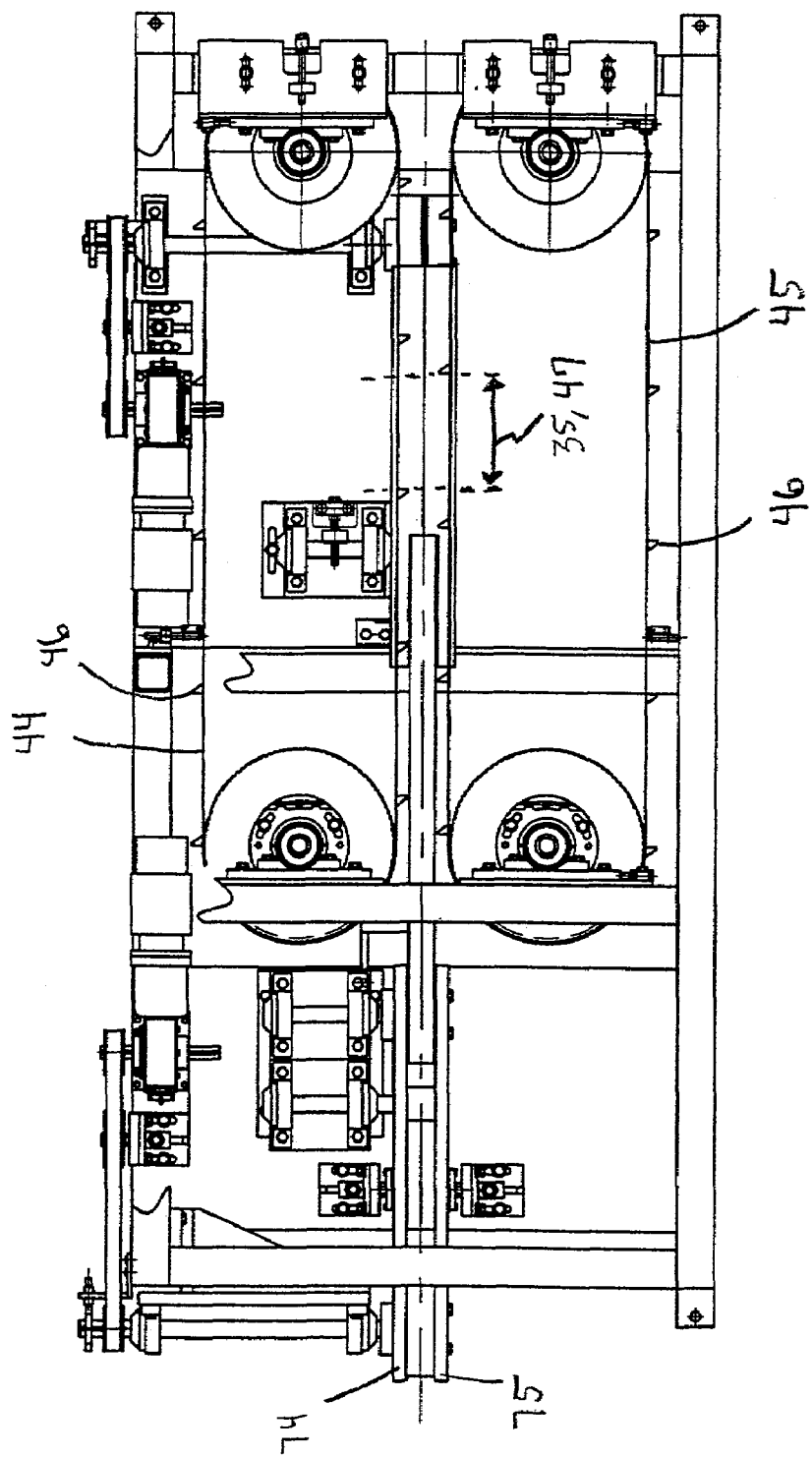
FIG. 5 representatively shows a partial cut-away top view of that seen FIG. 4.
Figure 6:
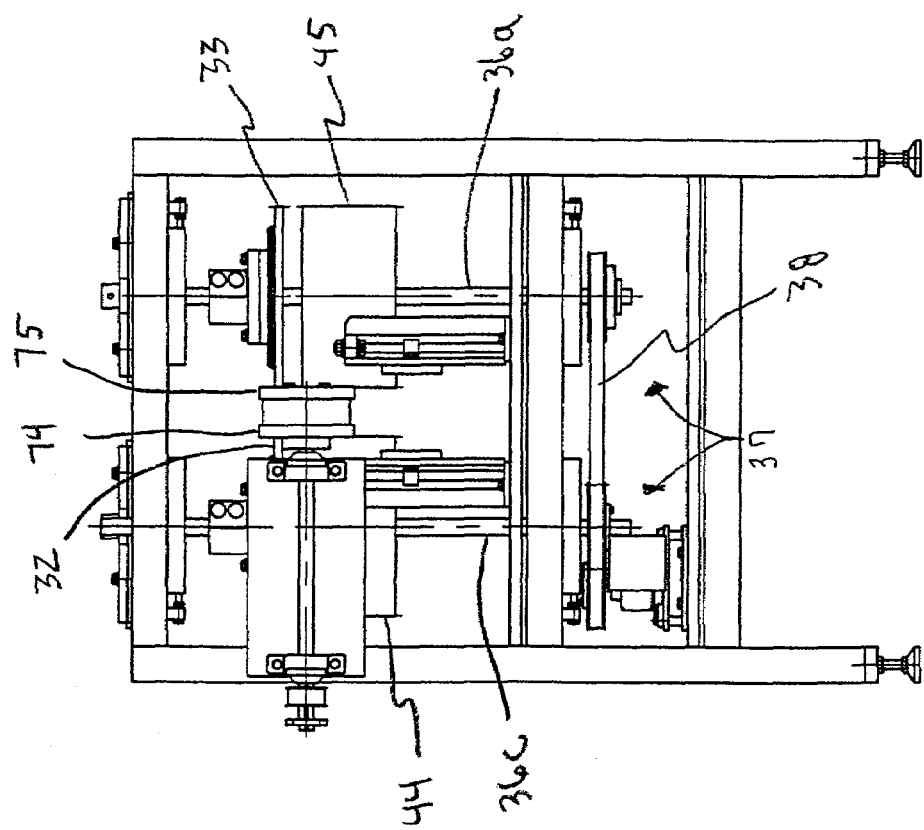
FIG. 6 representatively shows a left end view of that seen in FIG. 4.
Figure 7:
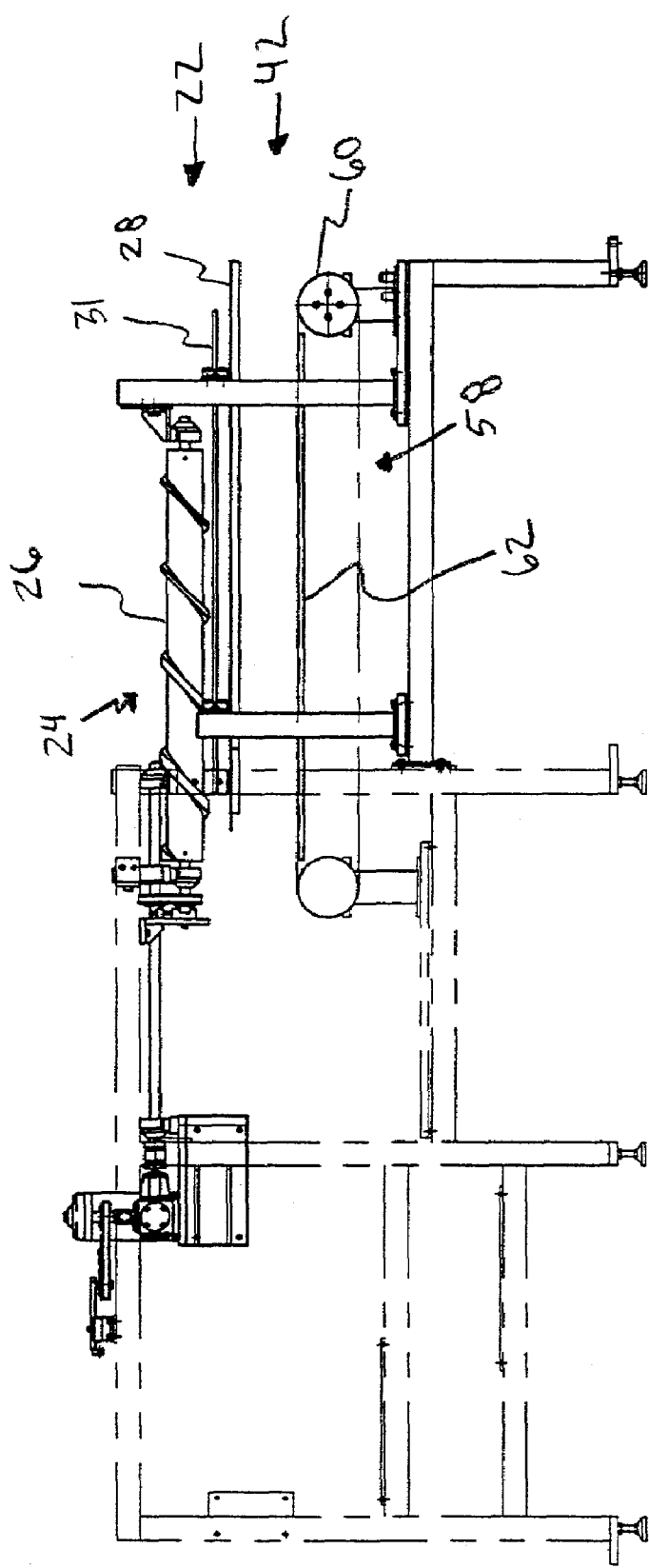
FIG. 7 representatively shows a schematic front view of a portion of the system and process seen in FIG. 2.
Figure 8:
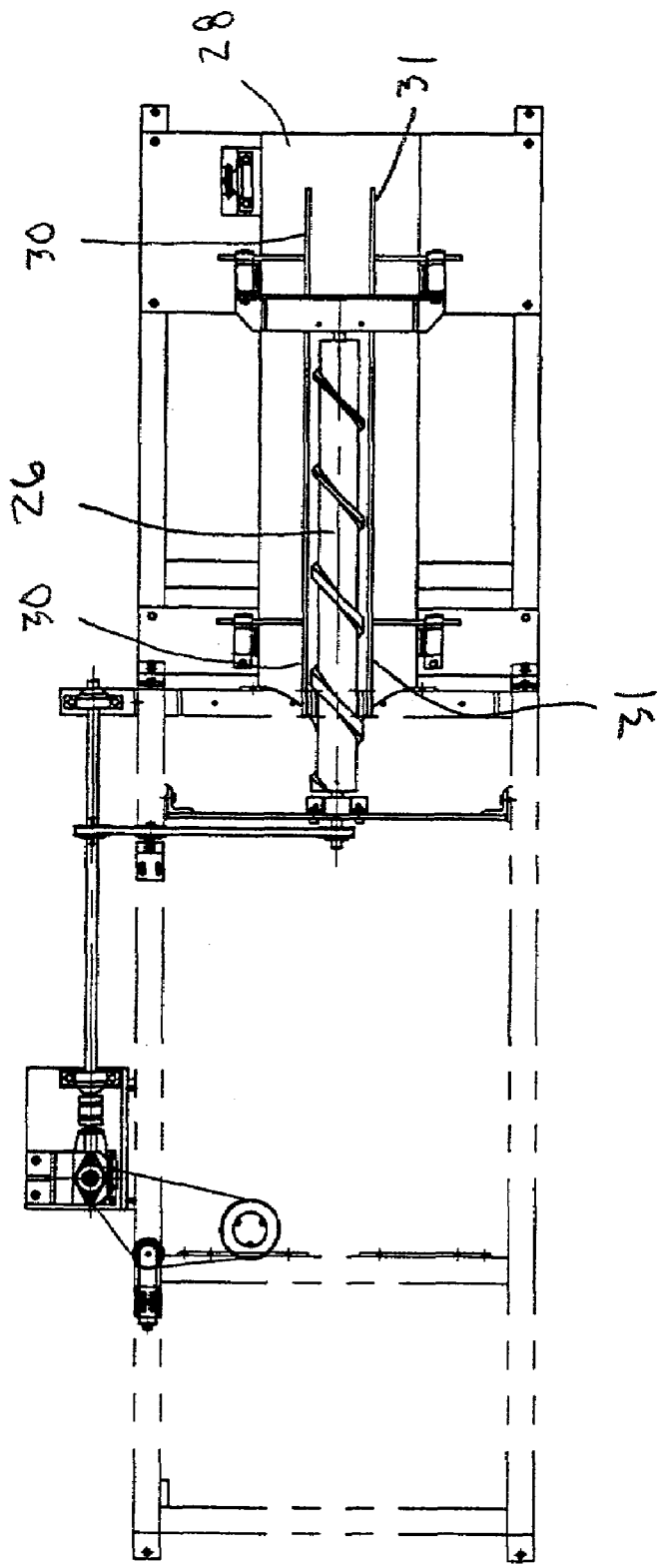
FIG. 8 representatively shows a top view of that seen FIG. 7.
Figure 9:
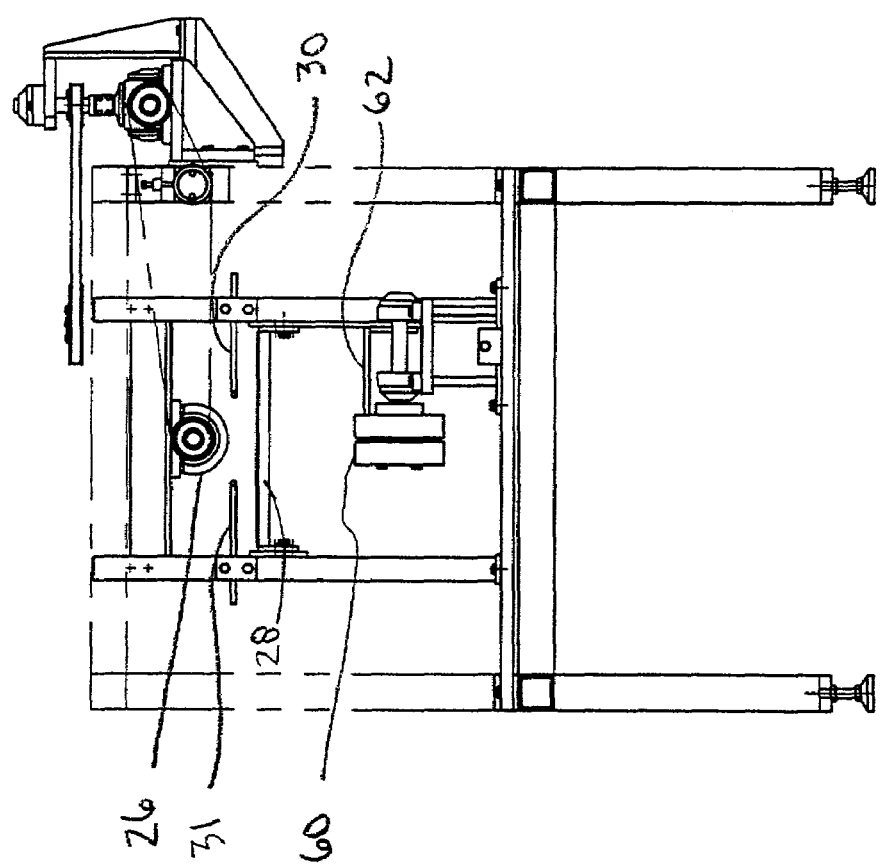
FIG. 9 representatively shows a right end view of that seen in FIG. 7.

Referring to FIG. 3, and although generally discussed above, another aspect of the invention concerns a process for loading containers 12 with formed product 18. The process can include the following steps, advantageously in this order though such order may not be required. First, formed product 18, e.g., stacks of wipes, can be provided in step 100. Next, the formed product is supplied to the product transport assembly 40 in step 101. In step 102, the formed product is advanced and positioned along the second path 42 leading to the loading zone 90, and such that the containers and the product are advanced and positioned in at least one common direction of travel and with each path in part independent of the other. Next, the formed product is advanced up the product escalator 48 and into the loading zone where the first and second paths 22, 42, intersect or merge, in step 103. Steps 100 to 103 occur near simultaneous with, and at least in relationship to, steps 104 to 106. In step 104 containers 12, e.g., preformed containers such as rigid tubs, are provided. Then, the containers are supplied to the product transport assembly 40, in step 105. Next, the containers are advanced and positioned in the opening down position 16 along the first path 22 leading towards the loading zone 90, in step 106. As a part of the overall system and process, the first path superimposes the second path at least in the loading zone, and additionally, the first path and the second path share at least one common direction of travel where each path can be in part independent of the other and each path is in part merged with the other (i.e., in the loading zone).

In step 107, the formed product 18 is loaded up into the containers in the loading zone. Next, the loaded containers 19 are advanced away from the loading zone along the third path 72, in step 108. Finally, assembly (e.g., attaching the cover and/or top or other parts of the dispenser together) and packaging of the loaded containers is completed and they are otherwise made ready for consumer use, in step 109. The process can be implemented, in one aspect, as a commercial production process and as such, advantageously all of the steps are repeated multiple times, continuously, for as long as containers loaded with formed product is desired. Various other aspects of the process can include features previously discussed, e.g., providing preformed containers to the first path, and others.

Referring generally to the FIG. 1, the formed product 18, such as a stack of sheets, can include any suitable number of individual sheets depending upon the desired packaging and end use. The formed product 18 could be made into a stack from a group of sheets separate from one another and folded in a conventional c-folded, z-folded, quarter-folded, etc. configuration where adjacent wipes are generally not connected to one another, such as that found in the baby wipes product presently sold by Kimberly-Clark Corporation and known as HUGGIES® Natural Care. Alternatively, product 18 could be made into a stack from a group of sheets connected to one another, e.g., by interfolding, adhesive or a weakened line such as perforations between adjacent sheets. One type of connected stack could be a fan folded stack such as that taught in U.S. Ser. No. 09/871,019 filed May 31, 2001 entitled "Stack Of Fan Folded Material And Combinations Thereof", which is owned by the same assignee of the instant application. Still alternatively, product 18 could be made into a roll from a group of sheets connected to one another, e.g., by interfolding, adhesive or a weakened line such as perforations between adjacent sheets. One type of connected stack could be a roll such as that taught in PCT application, WO 01/76437 published Oct. 18, 2001 entitled "Roll Of Wet Wipes", which is owned by the same assignee of the instant application. For example, the product 18 can be configured to include at least about 5 wet wipes and desirably from about 16 to about 320 individual sheets, and more desirably from about 32 to about 160 sheets. The size and shape of the product 18 is dependent upon the size and shape of the package/dispenser and vice versa. For example, the length of an assembled stack of wet wipes sheets can be about 190 mm, with a height of about 90 mm and a width of about 100 mm.

Each sheet can be generally rectangular in shape and defines a pair of opposite side edges and a pair of opposite end edges which can be referred to as a leading end edge and a trailing end edge. Each sheet defines an unfolded width and an unfolded length. The sheets can have any suitable unfolded width and length. For example, sheets of wet wipes can have an unfolded length of from about 2.0 to about 80.0 centimeters or from about 10.0 to about 26.0 centimeters and an unfolded width of from about 2.0 to about 80.0 centimeters or from about 10.0 to about 45.0 centimeters.

Materials suitable for the sheets of the present invention are well known to those skilled in the art. The sheets can be made from any material suitable for use as a wipe, including meltblown, coform, airlaid, bonded-carded web materials, spunlace, hydroentangled materials, high wet-strength tissue and the like and can comprise synthetic or natural fibers or combinations thereof. For wet wipes, they can have a dry basis weight of from about 25 to about 120 grams per square meter or from about 40 to about 90 grams per square meter.

In a particular aspect, sheets of wet wipes of the present invention can comprise a coform basesheet of polymeric microfibers and cellulosic fibers having a basis weight of from about 60 to about 100 grams per square meter or about 80–85 grams per square meter. Such coform basesheets can be manufactured generally as described in U.S. Pat. No. 4,100,324 to Anderson et al. which issued Jul. 11, 1978, and which is herein incorporated by reference. More particularly, such coform basesheets can be manufactured as are described as part of recently filed U.S. patent application Ser. No. 09/751,329, filed on Dec. 29, 2000 entitled, "Composite Material With Cloth-like Feel", and which is incorporated herein by reference. Typically, such coform basesheets comprise a gas-formed matrix of thermoplastic polymeric meltblown microfibers, such as, for example, polypropylene microfibers, and cellulosic fibers, such as, for example, wood pulp fibers. The relative percentages of the polymeric microfibers and cellulosic fibers in the coform basesheet can vary over a wide range depending on the desired characteristics of the wet wipes. For example, the coform basesheet can comprise from about 20 to about 100 weight percent, from about 20 to about 60 weight percent, or from about 30 to about 40 weight percent of polymeric microfibers based on the dry weight of the coform basesheet being used to provide the wet wipes. An example of such a coform basesheet for use in the present invention is found in the baby wipes product presently sold by Kimberly-Clark Corporation and known as HUGGIES® Natural Care.

In another aspect of the invention, the wipes stack 18 can contain a liquid which can be any solution which can be absorbed into the wipes, thus making them "wet wipes." The wipes can be moistened at any time before the wipes are actually used by the consumer. They can be moistened some time during the manufacturing process before or contemporaneous with the plurality of wipes being sealed in a dispenser or other packaging for next use by a product user. The liquid contained within the wet wipes can include any suitable components which provide the desired wiping properties. For example, the components can include water, emollients, surfactants, preservatives, chelating agents, pH buffers, fragrances or combinations thereof. The liquid can also contain lotions, ointments and/or medicaments. An example of such a liquid for use in the present invention is found in the baby wipes product presently sold by Kimberly-Clark Corporation and known as HUGGIES® Natural Care.

The amount of liquid or solution contained within each wet wipe can vary depending upon the type of material being used to provide the wet wipe, the type of liquid being used, the type of container being used to store the stack of wet wipes, and the desired end use of the wet wipe. Generally, each wet wipe can contain from about 25 to about 600 weight percent or from about 200 to about 400 weight percent liquid based on the dry weight of the wipe, for improved wiping in certain situations. To determine the liquid add-on, first the weight of a just-manufactured dry wipe is determined. Then, the amount of liquid by weight equal to the weight of the just-manufactured dry wipe, or an increased amount of liquid measured as a percent add-on based on the weight of the just-manufactured dry wipe, is added to the wipe to make it moistened, and then known as a "wet wipe" or "wet wipes". In a particular aspect wherein the wet wipe is made from a coform material comprising from about 30 to about 40 weight percent polymeric microfibers based on the dry weight of the wipe, the amount of liquid contained within the wet wipe can be from about 250 to about 350 weight percent or about 330 weight percent based on the dry weight of the wet wipe. If the amount of liquid is less than the above-identified range, the wet wipes can be too dry and may not adequately perform depending on the intended use. If the amount of liquid is more than the above-identified range, the wet wipes can be too wet and may exceed their saturation point such that excess liquid drips or runs away from the stack.

Figure 10:
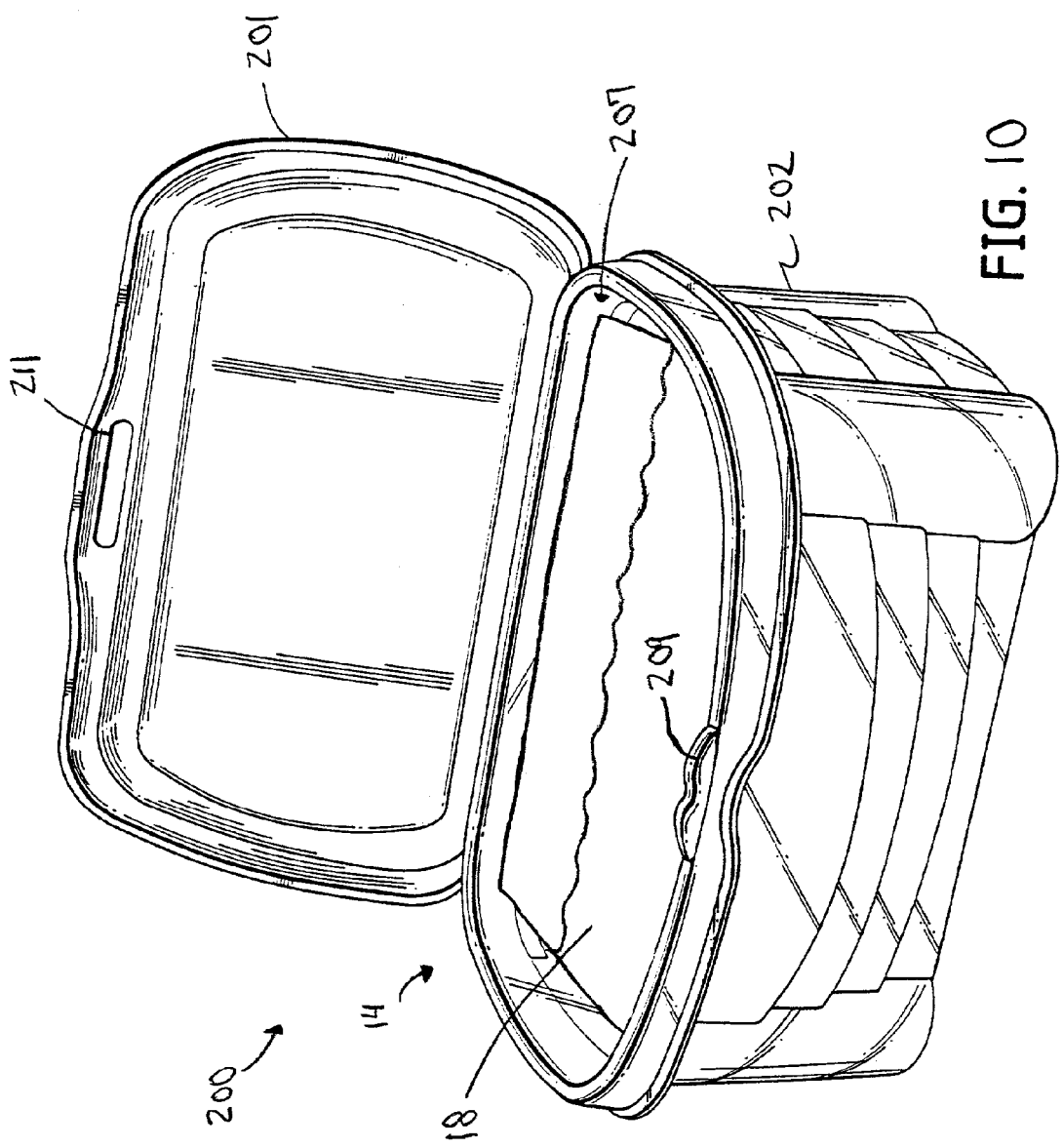
FIG. 10 shows an example of a container, e.g., preformed tub, for loading formed product into, through practice of the invention.

The plurality of sheets in stack 18, e.g., wet wipes, can be arranged in a package or dispenser in any manner which provides convenient and reliable one at a time dispensing, and for wet wipes which assists the wet wipes in not becoming overly dry. An example of rigid containers suitable for use with the present invention are disclosed in U.S. Ser. No. 6,269,969 issued Aug. 7, 2001 entitled "Wet Wipes Container With Improved Closure" (FIG. 10) and in PCT application, WO 01/74687 published Oct. 11, 2001 entitled "Wet Wipe Container With Flexible Orifice" (FIG. 11), both assigned to the assignee of the present application. FIG. 10 shows a rigid plastic wet wipe dispenser 200. Dispenser 200 includes a top 201 hingedly attachable to a base 202. The dispensing opening 207 is illustrated as an opening of the base through which individual wet wipes are removed from the container in a reach-in format. The top can be secured in a closed position by a suitable latching mechanism, in which a protrusion 209 in the front lip of the base is engaged by an opening 211 in the front lip of the top. For loading, the top 301 would likely not be attached to the base 302, but such is not required by the invention. In use, the top 201 is opened and then access to the stack 18 of wipes is gained. The user then passes his or her hand, etc., through the opening 207 to grab the first wipe in the stack of wipes. In this reach-in format, the top wipe is separated from the succeeding wipe as it is pulled away from the remainder of the stack. With the reach-in format, generally the wipes are not interfolded or in any way intentionally connected to one another so whenever a wipe is desired, each individual wipe needs to be retrieved from the top of the stack anew. After the desired number of wipes are taken, the top 201 can be sealed closed. At a later time when another wipe(s) is desired, the preceding steps can generally be followed again.

Figure 11:
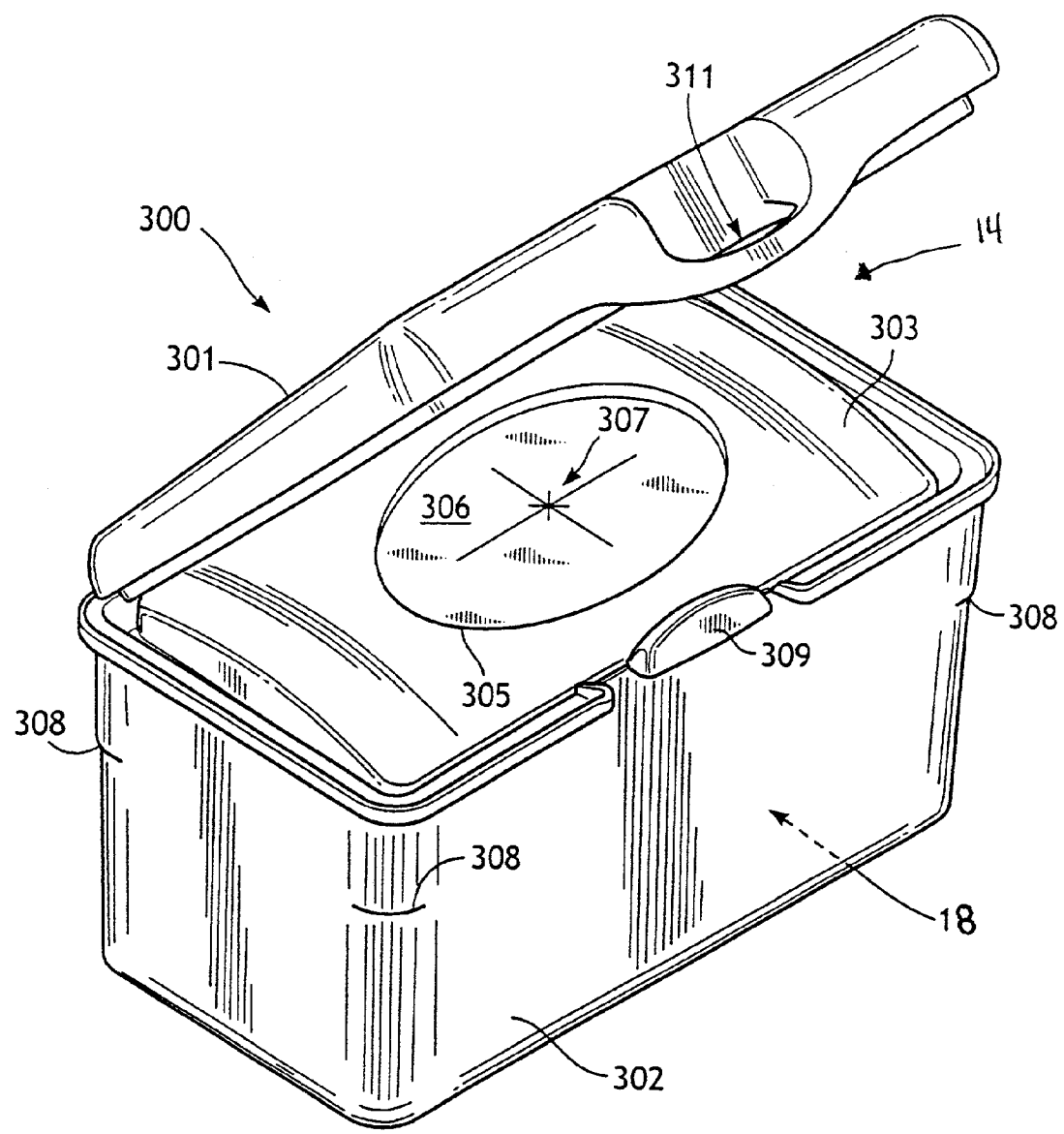
FIG. 11 shows an example of a different container, e.g., preformed tub, for loading formed product into, through practice of the invention.

FIG. 11 shows an alternate rigid plastic wet wipe dispenser 300. Dispenser 300 includes a top 301 hingedly attachable to a base 302 and a removable inner cover 303. The removable inner cover contains a pop-up style wipe dispenser including a rigid port 305 which surrounds a flexible, rubber-like material or sheet 306 having a dispensing opening 307. The dispensing opening 307 is illustrated as several slits through which individual wet wipes are removed from the container. The cover is removably secured to the sidewalls of the base by a small lip around the periphery of the inner cover that engages notches with several protruding ribs on the inner surface of the sidewalls (not shown). It also rests on a small support surface in each of the four corners of the base, which is outwardly visible by discontinuities 308 in the rounded corners of the base. For loading, the cover 303 and top 301 would likely not be attached to the base 302, but such is not required by the invention. The top is secured in a closed position by a suitable latching mechanism, in which a protrusion 309 in the front lip of the base is engaged by an opening 311 in the front lip of the top. The shape of the rigid port in the embodiment shown in FIG. 11 is oval, but can be any shape and size large enough to enable the user to reach into the container with their fingers to grasp the next available wet wipe in the event of a dispensing failure, or if reach-in dispensing is preferred to further aid in moisture retention of the wipes.

To use the container seen in FIG. 11, the user opens the top 201 and then passes his or her hand, etc., through the opening 307 to grab the first wipe in the stack of wipes. Once the user grabs the wipe, it can then pass through the opening 307 and out of the container as the user pulls it up. If the user does not immediately need the wipe, it can be left in the opening partially dispensed where it can be maintained in place by the sheet 306 until desired later. The partially dispensed wipe will just rest in place in the opening, part in the container base below the sheet 306 and part above sheet 306, conveniently ready for later dispensing in the pop-up format. If the user does immediately desire to use the wipe, it can pass the complete wipe through the dispensing portion and out of the package. For pop-up dispensing, the wipe will become separated or disjointed from the subsequent adjacent second wipe at a separably joined interface (e.g., weakened line, adhesive joint, or other mechanism) after fully dispensing the first wipe and while a portion of the second wipe remains in the opening 307. The next wipe for dispensing may be automatically maintained in the opening partially dispensed for later use (i.e., in a pop-up dispensing format). Alternatively, the following wipe may need to be fetched out of the container below the sheet 306 similar to the first wipe at a later time when it is desired, commonly called reach-in dispensing, if the user pushed the following wipe back into the container below sheet 306 after pop-up dispensing of the leading wipe. In either case, after the desired number of wipes are taken, the top 301 can be sealed closed, with or without a wipe partially dispensed in the opening 307, as discussed previously. At a later time when another wipe(s) is desired, the preceding steps can generally be followed again.

All publications, patents, and patent documents cited in the specification are incorporated by reference herein, as though individually incorporated by reference. In the case of any inconsistencies, the present disclosure, including any definitions herein, will prevail. While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

What is claimed is:

1. A system for loading containers with formed product comprising:
    a container transport assembly which advances and positions the containers along a first path towards a loading zone;
    the container transport assembly comprising a spacing mechanism comprising a screw-like feeder in combination with a support pathway and a pair of spaced guides;
    a product transport assembly which advances and positions the formed product along a second path towards the loading zone wherein the containers are advanced and positioned relative to the formed product and in at least one common direction of travel with the formed product and wherein at least a portion of the first path superposes the second path and the paths travel in a common linear direction towards the loading zone; and
    a combined transport assembly defining a third path away from the loading zone wherein the first path and the second path share at least one common direction of travel and each path is in part independent of the other and each path is in part merged with the other wherein the formed product is loaded up into the containers in a loading direction against a force of gravity as the paths merge and therafter the containers with formed product loaded therein are advanced away from the loading zone along the third path.

2. The system of claim 1 wherein the containers are preformed before entry into the first path.

3. The system of claim 1 wherein the container transport assembly comprises a pair of container transport belts with each container transport belt spaced apart from the other and configured to maintain the containers therebetween.

4. The system of claim 3 wherein the container transport belts each comprise spaced lugs located on their outer surface.

5. The system of claim 4 wherein a relative positioning of the container transport belts can be modified to accommodate locating various size containers therebetween.

6. The system of claim 1 wherein the product transport assembly comprises a pair of product transport belts with each product transport belt spaced apart from the other and configured to maintain the formed product therebetween.

7. The system of claim 6 wherein the product transport belts each comprise spaced lugs located on their outer surface.

8. The system of claim 7 wherein a relative positioning of the product transport belts can be modified to accommodate locating various size formed stacks therebetween.

9. The system of claim 6 wherein the product transport assembly further comprises a product escalator and the product escalator operates in tandem with the pair of product transport belts.

10. The system of claim 1 wherein the product transport assembly comprises a product escalator.

11. The system of claim 10 wherein the product escalator comprises a plurality of finger groups and each finger group comprises a plurality of graduated fingers connected to an escalator belt.

12. The system of claim 1 wherein the combined transport assembly comprises a combined transport belt.

13. A system for loading containers with formed product comprising:
- a container transport assembly which advances and positions the containers along a first path towards a loading zone, the containers having an opening and being in an opening down position;
- a product transport assembly which advances and positions the formed product along a second path towards the loading zone wherein the containers are advanced and positioned relative to the formed product and in at least one common direction of travel with the formed product; and
- a combined transport assembly defining a third path away from the loading zone wherein the first path and the second path share at least one common direction of travel and each path is in pad independent of the other and each path is in pad merged with the other wherein the formed product is loaded up into the containers in a loading direction against a force of gravity as the paths merge and thereafter the containers with formed product loaded therein are advanced away from the loading zone along the third path.

14. The system of claim 13 wherein the containers are preformed before entry into the first path.

15. The system of claim 13 wherein the container transport assembly comprises a spacing mechanism.

16. The system of claim 15 wherein the spacing mechanism comprises a screw-like feeder in combination with a support pathway and a pair of spaced guides.

17. The system of claim 13 wherein the container transport assembly comprises a pair of container transport belts with each container transport belt spaced apart from the other and configured to maintain the containers therebetween.

18. The system of claim 17 wherein the container transport belts each comprise spaced lugs located on their outer surface.

19. The system of claim 18 wherein a relative positioning of the container transport belts can be modified to accommodate locating various size containers therebetween.

20. The system of claim 13 wherein the product transport assembly comprises a pair of product transport belts with each product transport belt spaced apart from the other and configured to maintain the formed product therebetween.

21. The system of claim 20 wherein the product transport belts each comprise spaced lugs located on their outer surface.

22. The system of claim 21 wherein a relative positioning of the product transport belts can be modified to accommodate locating various size formed stacks therebetween.

23. The system of claim 20 wherein the product transport assembly further comprises a product escalator and the product escalator operates in tandem with the pair of product transport belts.

24. The system of claim 13 wherein the product transport assembly comprises a product escalator.

25. The system of claim 24 wherein the product escalator comprises a plurality of finger groups and each finger group comprises a plurality of graduated fingers connected to an escalator belt.

26. The system of claim 13 wherein the combined transport assembly comprises a combined transport belt.

27. A system for loading containers with formed product comprising:
- a container transport assembly which advances and positions the containers along a first path towards a loading zone, the containers having an opening and being in an opening down position;
- a product transport assembly which advances and positions the formed product along a second path towards the loading zone wherein the containers are advanced and positioned relative to the formed product and in at least one common direction of travel with the formed product and wherein at least a portion of the first path superposes the second path and the paths travel in a common linear direction towards the loading zone; and
- a combined transport assembly defining a third path away from the loading zone wherein the first path and the second path share at least one common direction of travel and each path is in part independent of the other and each path is in part merged with the other wherein the formed product is loaded up into the containers in a loading direction against a force of gravity as the paths merge and thereafter the containers with formed product loaded Therein are advanced away from the loading zone along the third path.

28. The system of claim 27 wherein the containers are preformed before entry into the first path.

29. The system of claim 27 wherein the container transport assembly comprises a pair of container transport belts with each container transport belt spaced apart from the other and configured to maintain the containers therebetween.

30. The system of claim 27 wherein the product transport assembly comprises a pair of product transport belts with each product transport belt spaced apart from the other and configured to maintain the formed product therebetween.

31. The system of claim 27 wherein the product transport assembly comprises a product escalator.

32. A system for loading containers with formed product comprising:
- means for moving the containers along a first path towards a loading zone;
- means for moving the formed product along a second path towards the loading zone, the means for moving the formed product comprising a product escalatorm
- wherein the containers are moved relative to the formed product and in at least one common direction of travel with the formed product and wherein at least a portion of the first path superposes the second path and the paths travel in a common linear direction towards the loading zone; and
- means for moving the containers and the formed product together along a third path away from the loading zone wherein the first path and the second path share at least one common direction of travel and each path is in part independent of the other and each path is in part merged with the other wherein the formed product is loaded up into the containers in a loading direction against a force of gravity as the paths merge and thereafter the containers with formed product loaded therein are moved away from the loading zone along the third path by the means for moving containers and formed product together.

33. The system of claim 32 wherein the containers are preformed before entry into the first path.

34. The system of claim 32 wherein the means for moving the containers comprises a screw-like feeder in combination with a support pathway and a pair of spaced guides.

35. The system of claim 34 wherein the means for moving the containers further comprises a pair of container transport belts with each container transport belt spaced apart from the other and configured to maintain the containers therebetween.

36. The system of claim 35 further comprising means for locating various size containers between the pair of container transport belts.

37. The system of claim 32 wherein the means for moving the formed product comprises a pair of product transport belts with each product transport belt spaced apart from the other and configured to maintain the formed product therebetween.

38. The system of claim 37 further comprising means for locating various size formed stacks between the pair of product transport belts.

39. The system of claim 32 wherein the means for moving the containers comprises a combined transport belt.

* * * * *